(12) United States Patent
Pan et al.

(10) Patent No.: US 12,366,700 B2
(45) Date of Patent: Jul. 22, 2025

(54) KEYBOARD WITH LIGHTING BOARD FOR BACKLIGHTING KEYCAP

(71) Applicant: Darfon Electronics Corp., Taoyuan (TW)

(72) Inventors: Yi-Jui Pan, Taoyuan (TW); Po-Yueh Chou, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 0 days.

(21) Appl. No.: 18/884,569

(22) Filed: Sep. 13, 2024

(65) Prior Publication Data

US 2025/0093569 A1    Mar. 20, 2025

Related U.S. Application Data

(60) Provisional application No. 63/582,557, filed on Sep. 14, 2023.

(30) Foreign Application Priority Data

Sep. 6, 2024 (TW) ................................. 113209748

(51) Int. Cl.
*H01H 13/02* (2006.01)
*F21V 8/00* (2006.01)

(52) U.S. Cl.
CPC ......... *G02B 6/0055* (2013.01); *G02B 6/0021* (2013.01); *H01H 13/023* (2013.01)

(58) Field of Classification Search
CPC ................. H01H 13/02; H01H 13/023; H01H 2013/026; H01H 3/12; H01H 3/125; H01H 2003/127; H01H 9/161
See application file for complete search history.

(56) References Cited

U.S. PATENT DOCUMENTS

| | | | | |
|---|---|---|---|---|
| 4,772,769 A * | 9/1988 | Shumate | ............... | H01H 13/702 200/317 |
| 6,765,503 B1 * | 7/2004 | Chan | ..................... | H01H 13/702 362/85 |
| 6,860,612 B2 * | 3/2005 | Chiang | ................ | G02B 6/0068 362/23.05 |
| 6,918,677 B2 * | 7/2005 | Shipman | ................ | H01H 13/70 362/555 |
| 7,525,056 B2 * | 4/2009 | Chiba | .................... | H01H 13/83 200/314 |
| 8,168,903 B2 * | 5/2012 | Chen | ..................... | H01H 13/83 200/310 |

(Continued)

*Primary Examiner* — Ismael Negron
(74) *Attorney, Agent, or Firm* — McClure, Qualey & Rodack, LLP

(57) ABSTRACT

A lighting board includes a substrate having an insulation surface, a plurality of openings penetrating through the substrate, a plurality of coupling members disposed on the substrate and configured to connect to at least one keycap, a lighting circuit disposed on the insulation surface at a side opposite to the coupling members, an illuminant electrically connected to the lighting circuit, and a protective layer disposed on the insulation surface and covering the lighting circuit. A keyboard includes the lighting board, a light guide sheet, and at least one keycap, such that light from the illuminant enters the light guide and propagates transversely to illuminate the at least one keycap.

20 Claims, 14 Drawing Sheets

(56) References Cited

U.S. PATENT DOCUMENTS

| | | | |
|---|---|---|---|
| 8,530,768 B2* | 9/2013 | Hwa | H01H 13/83 |
| | | | 362/616 |
| 12,087,517 B2* | 9/2024 | Tsai | H01H 13/7006 |
| 12,315,686 B2* | 5/2025 | Huang | H01H 13/023 |
| 2011/0247925 A1* | 10/2011 | Lin | H01H 3/125 |
| | | | 200/314 |
| 2024/0096567 A1* | 3/2024 | Chen | H01H 13/83 |
| 2024/0379303 A1* | 11/2024 | Chen | H01H 3/125 |
| 2025/0095930 A1* | 3/2025 | Pan | H01H 13/83 |

\* cited by examiner

KEYBOARD WITH LIGHTING BOARD FOR BACKLIGHTING KEYCAP

CROSS-REFERENCE TO RELATED APPLICATION

This application claims the priority benefits of Taiwan patent application serial No. 113209748, filed on Sep. 6, 2024, and also claims the priority benefits of U.S. provisional application Ser. No. 63/582,557, filed Sep. 14, 2023. The entirety of the mentioned above patent applications is hereby incorporated by reference herein and made a part of this specification.

BACKGROUND OF THE INVENTION

1. Field of the Invention

The invention generally relates to a lighting board. Particularly, the invention relates to a lighting board having keyswitch coupling members, and a backlit module, a backlit keyswitch and keyboard having the lighting board.

2. Description of the Prior Art

Conventional backlit keyswitches and keyboards are usually manufactured by separately forming the keyswitch structure that generates a trigger signal and the backlit module that provides backlight, and then combining the keyswitch structure and the backlit module together. However, the conventional keyswitch structure and backlight module are multi-layer stacked structures, respectively, so that the reduction in the overall thickness of the backlit keyswitch (or keyboard) is not easy, which is not conducive to the thinning of the device.

SUMMARY OF THE INVENTION

It is an object of the invention to provide a lighting board, which can serve as not only the baseplate for the keyswitch structure, but also the light source circuit board for the backlit module.

It is another object of the invention to provide a lighting board, which integrates the lighting circuit of the backlit module with the baseplate of the keyswitch structure to effectively reduce the overall thickness of the backlit keyswitch.

In an embodiment, the invention provides a lighting board for supporting at least one keycap. The lighting board includes a substrate having an insulation surface, a plurality of openings penetrating through the substrate, and a plurality of coupling members disposed on the substrate and configured to directly or indirectly connect the at least one keycap, a lighting circuit disposed on the insulation surface and located at a side opposite to the plurality of coupling members, an illuminant electrically connected to the lighting circuit, and a protective layer disposed on the insulation surface and covering the lighting circuit.

In another embodiment, the invention provides a lighting board for supporting a first keycap and a second keycap. The lighting board includes a substrate having an insulation surface corresponding to at least the first keycap, a plurality of openings penetrating through the substrate, and a plurality of coupling members disposed on the substrate, a lighting circuit disposed on the insulation surface and located at a side opposite to the plurality of coupling members, an illuminant electrically connected to the lighting circuit and corresponding to at least the first keycap, and a protective layer disposed on the insulation surface and covering the lighting circuit, wherein the protective layer corresponds to at least the first keycap, and the plurality of coupling members are configured to directly or indirectly connect the first keycap and the second keycap, so that the first keycap and the second keycap are capable of moving relative to the lighting board independently.

In an embodiment, the substrate is a non-metal plate, and the insulation surface is a lower surface of the non-metal plate.

In an embodiment, the substrate includes a metal plate and an insulation layer at least partially covering a lower surface of the metal plate; a surface of the insulation layer serves as the insulation surface.

In an embodiment, the lighting board further includes a switch circuit layer, wherein the switch circuit layer and the lighting circuit are disposed at two opposite sides of the substrate; the switch circuit layer has a switch unit; a vertical projection of the switch unit overlaps the illuminant.

In an embodiment, the switch circuit layer has a switch circuit electrically connected to the switch unit; a vertical projection of the switch circuit overlaps the lighting circuit.

In an embodiment, the substrate has a plurality of ribs configured to define the plurality of openings; the switch circuit and the lighting circuit are disposed above and below at least one of the plurality of ribs, respectively.

In an embodiment, the vertical projection of the switch unit and a vertical projection of the illuminant fall within a range surrounded by the plurality of coupling members.

In an embodiment, the substrate has a plurality of ribs configured to define the plurality of openings; the protective layer has a reflective surface and/or a microstructure; the microstructure overlaps at least one of the plurality of ribs.

In an embodiment, the insulation surface and/or the protective layer further corresponds to the second keycap.

In another embodiment, the invention provides a backlit module including the lighting board described above and a light guide sheet, wherein light emitted from the illuminant enters the light guide sheet to propagate transversely to illuminate the at least one keycap or illuminate the first keycap and the second keycap.

In an embodiment, the light guide sheet has a light hole; the illuminant is accommodated in the light hole.

In an embodiment, the backlit module further includes a glue layer disposed around the illuminant and located between the light guide sheet and the protective layer, wherein a glue-free region is formed between the light hole and the glue layer.

In an embodiment, the backlit module further includes a reflective layer disposed at a side of the light guide sheet opposite to the protective layer, wherein the reflective layer has an edge attached to the protective layer or the substrate.

In an embodiment, the reflective layer is attached to the protective layer or the substrate by a side glue layer; the reflective layer has a microstructure disposed between the side glue layer and the light guide sheet.

In an embodiment, the backlit module further includes a light-absorption layer disposed between the protective layer and the reflective layer or between the substrate and the reflective layer; the light-absorption layer is adjacent to the edge of the reflective layer.

In an embodiment, the backlit module further includes a reflective layer disposed at a side of the light guide sheet opposite to the protective layer, wherein the reflective layer has a microstructure located within the vertical projection of the light hole of the light guide sheet.

In an embodiment, the backlit module further includes a mask film disposed between the protective layer and the light guide sheet, wherein the mask film has at least one light-permeable window corresponding to the at least one keycap or the first keycap.

In another embodiment, the invention provides a backlit keyswitch including the lighting board described above and the at least one keycap (or the first keycap and the second keycap).

In a further embodiment, the invention provides a backlit keyboard including the lighting board described above and the at least one keycap (or the first keycap and the second keycap).

Compared with the prior art, the lighting board of the invention can function as the baseplate of the keyswitch structure and further has the lighting circuit to function as the circuit board of the backlit module at the same time. Moreover, the lighting board of the invention integrates the lighting circuit of the backlit module with the baseplate of the keyswitch structure, so that the overall thickness of keyswitch can be effectively reduced to facilitate the thinning design.

DETAILED DESCRIPTION OF THE PREFERRED EMBODIMENT

Figure 1:
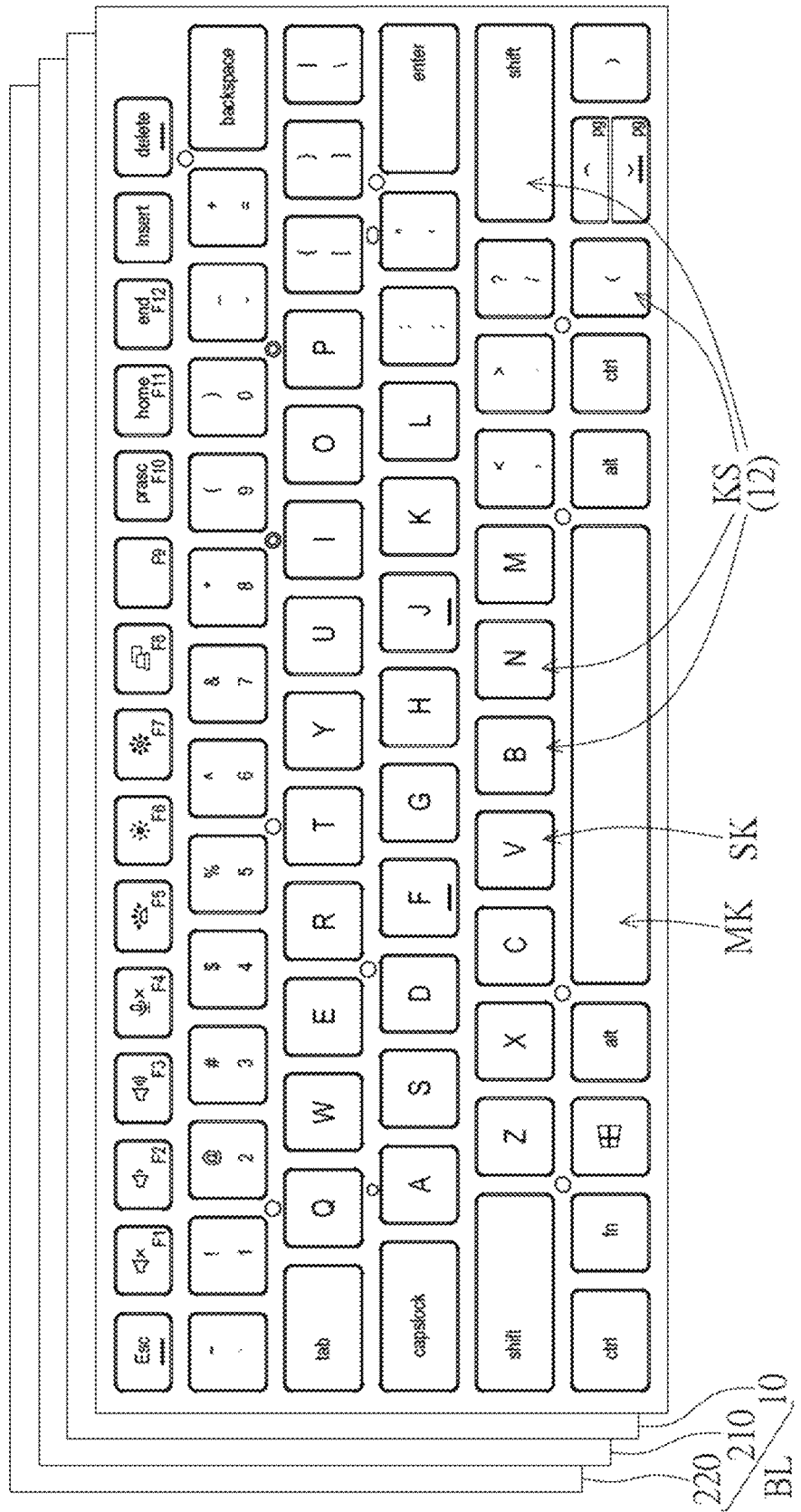
FIG. 1 is a schematic view of the backlit keyboard in a first embodiment of the invention.
Figure 2:
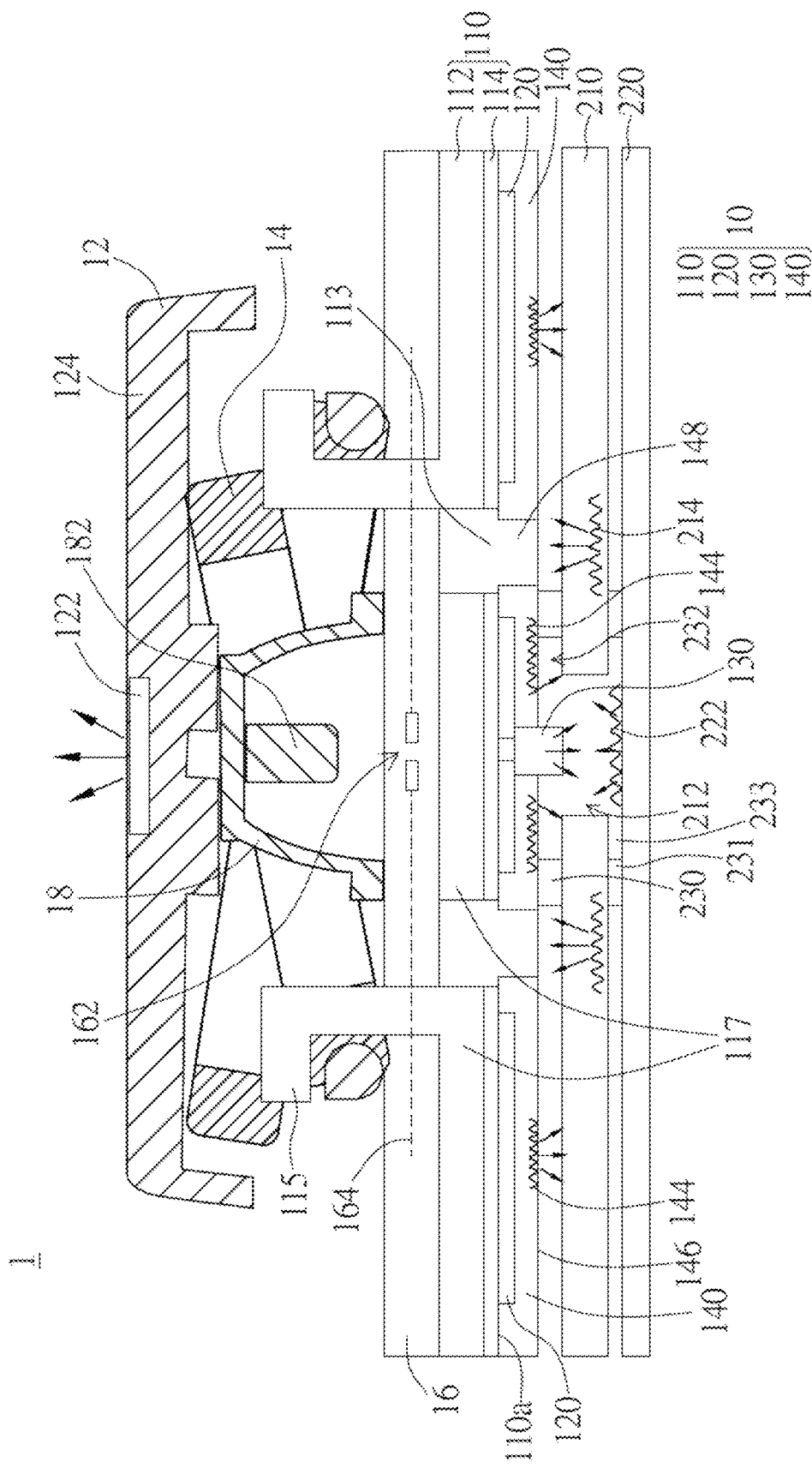
FIG. 2 is a schematic cross-sectional view of the backlit keyswitch in an embodiment of the invention.

The invention mainly involves the integration of the baseplate of the keyswitch and the lighting circuit of the backlit module to achieve the reduction in the overall thickness of keyswitch and to promote the ultimate luminous effect and the luminance uniformity of the backlit module for a single keyswitch or even the entire keyboard. Referring to FIG. 1 and FIG. 2, FIG. 1 is a schematic view of the backlit keyboard KB in a first embodiment of the invention, and FIG. 2 is a schematic cross-sectional view of the backlit keyswitch 1 in an embodiment of the invention. In an embodiment, the backlit keyboard KB of the invention includes a plurality of keyswitches KS (such as square keyswitches SK or multiple keyswitches MK) and a backlit module BL. Each keyswitch KS (e.g. the backlit keyswitch 1 in FIG. 2) includes a keycap 12, an up-down lift structure 14, a switch circuit layer 16, a restoring member 18, and a lighting board 10. For the backlit keyboard KB, the backlit module BL may include the lighting board 10, a light guide sheet 210, a reflective layer 220. In other words, the lighting board 10 can function as the baseplate of the keyswitch KS and the light source circuit board of the backlit module BL at the same time.

As shown in FIG. 2, the keycap 12 is disposed over the lighting board 10 and has a light permeable region 122 (e.g. one or more light permeable characters) and a light impermeable region 124. The up-down lift structure 14 is connected between the lighting board 10 and the keycap 12 and configured to support the up-down movement of the keycap 12 relative to the lighting board 10. The switch circuit layer 16 is disposed under the keycap 12 and preferably above the lighting board 10. The switch circuit layer 16 has a switch unit 162 and a switch circuit 164 electrically connected to the switch unit 162. When the keycap 12 is pressed, the switch unit 162 of the switch circuit layer 16 will be conducted to trigger the keyswitch signal. The restoring member 18 is disposed between the keycap 12 and the lighting board 10 and configured to provide a restoring force to enable the keycap 12 to move upward relative to the lighting board 10 to the non-pressed position when the pressing force is released. In this embodiment, the restoring member 18 can be embodied as an elastic member (e.g. rubber dome) and disposed corresponding to the switch unit 162. When the keycap 12 is pressed and moves downward to compress the restoring member 18, the triggering portion 182 of the restoring member 18 can trigger the switch unit 162, but not limited thereto, The switch unit 162 can be triggered by a triggering portion, which can be disposed on the restoring member 18, the up-down lift structure 14, or the keycap 12. According to practical applications, the restoring member 18 can be embodied as any suitable element, which can provide the restoring force to enable the keycap 12 to return the non-pressed position, such as spring, magnetic member. The switch of the backlit keyswitch 1 is not limited to the switch unit 162 of the switch circuit layer 16 and can be any suitable switch, which is triggered in response to the downward movement of the keycap 12, such as mechanical switch, magnetic switch, optical switch. In this embodiment, the up-down lift structure 14 can be embodied as a scissors-like up-down lift structure, which has two frames pivotally coupled with each other, and two ends of each frame are movably coupled to the lighting board 10 and the keycap 12, respectively, but not limited thereto. According to practical applications, the up-down lift structure 14 can be embodied as a butterfly up-down lift structure, a cantilever up-down lift structure, etc. The lighting board 10, the keycap 12, the up-down lift structure 14, the switch circuit layer 16, and the restoring member 18 constitute the keyswitch unit of the backlit keyswitch 1. Hereinafter, the lighting board 10 of the invention and the backlit module BL including the lighting board 10 will be described in detail.

Specifically, the lighting board 10 is configured to support at least one keycap, such as keycap 12. The lighting board 10 can include a substrate 110, a lighting circuit 120, an illuminant 130, and a protective layer 140. The substrate 110 has an insulation surface 110a, a plurality of openings 113, and a plurality of coupling members 115. The plurality of openings penetrate through the substrate 110 to allow light emitted from the illuminant 130 to pass therethrough to illuminate the keycap 12. For example, the substrate 110 has a plurality of ribs 117, which are configured to define the plurality of openings 113. The shape, amount, location of the ribs 117 and the openings 113 can be determined according to the structural strength of the backlit keyswitch 1, the location of the light permeable region 122 of the keycap 12, the power of the illuminant 130, etc. The plurality of coupling members 115 are disposed on the substrate 110 and configured to directly or indirectly connect the at least one keycap 12. In this embodiment, the coupling member 115 can be a hook-shaped coupler, and the keycap 12 is coupled to the lighting board 10 by coupling the up-down lift structure 14 with the coupling members 115, but not limited thereto. According to practical applications, the coupling member 115 can be in the form of a groove, a post, etc.

In an embodiment, the substrate 110 can include a metal plate 112 and an insulation layer 114. The insulation layer 114 at least partially covers a lower surface of the metal plate 112, and a surface (e.g. lower surface) of the insulation layer 114 serves as the insulation surface 110a. The metal plate 112 can be a conductive plate, such as an aluminum alloy plate or a steel plate, so that the metal plate 112 itself can shield radio waves and functions as a grounding component to reduce the electrostatic discharge (ESD) problem. The insulation layer 114 can be formed by any suitable methods, such as adhering, printing, coating, disposition, molding, to cover the lower surface of the metal plate 112, so that the insulation surface 110a will be formed on the lower surface of the substrate 110. For example, the insulation layer 114 can be disposed on the entire lower surface of the metal plate 112 or a partial lower surface of the metal plate 112 where the lighting circuit 120 is to be arranged. In an embodiment (not shown), the insulation layer 114 can further cover the inner wall (sidewall) of the opening 113 (or other through holes), the sidewall of the metal plate 112, the surface of the coupling member 115, and/or the upper surface of the metal plate 112 to prevent the ESD problem caused by the exposure of metal plate 112. Moreover, the insulation layer 114 can include any suitable insulative material, such as polymers, dielectrics, which can electrically isolate the metal plate 112 from conductive wirings (e.g. the lighting circuit 120). When the substrate 110 adopts the metal plate 112, the coupling members 115 can be formed by the following methods, for example: (1) stamping the metal plate to form flat coupling members, and then bending the coupling members to stand on the metal plate, (2) using the insert-molding technique to form plastic coupling members on the metal plate, or (3) using the hot-melting technique to fix preformed plastic coupling members on the metal plate, but not limited thereto. In another embodiment, the substrate 110 can be a non-metal plate, such as a non-conductive plate made of glass fiber, carbon fiber, artificial resin, or polymers, and the insulation surface 110a can be the lower surface of the non-metal plate. When the substrate 110 adopts the non-metal plate, the coupling members 115 can be formed by the following methods, for example: (1) using the mold injection technique to form the substrate 110 with the coupling members 115 at one time, (2) using the insert-molding technique to form plastic coupling members on the non-metal plate, (3) using the hot-melting technique to fix preformed plastic coupling members on the non-metal plate, (4) fixing a metal frame with the coupling members 115 on the non-metal plate, or (5) fixing a metal frame on the non-metal plate, and then using the hot-melting technique to fix preformed plastic coupling members on the metal frame, but not limited thereto.

Figure 3:
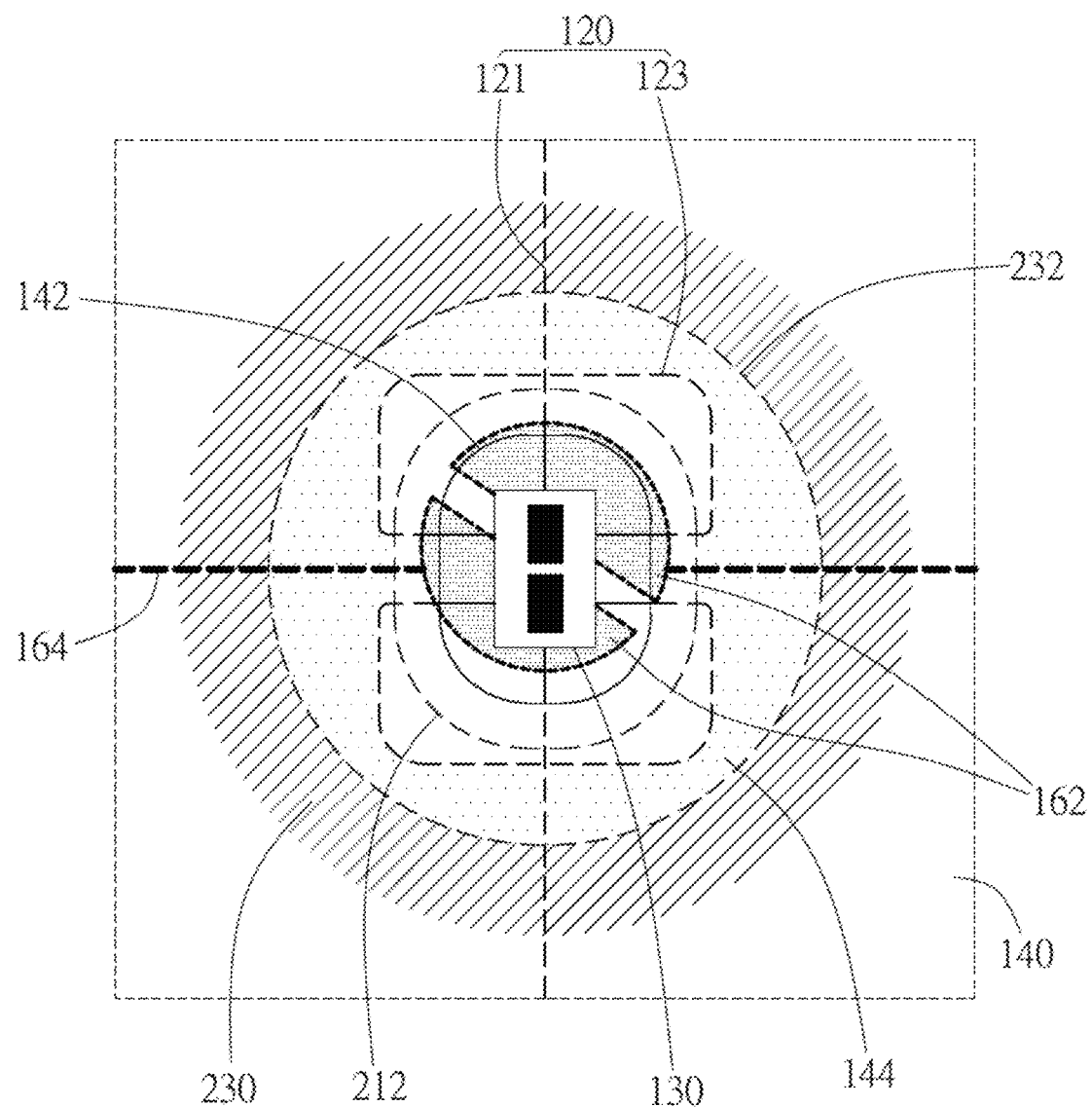
FIG. 3 is a schematic bottom view showing the lower surface of the lighting board around the illuminant in an embodiment of the invention.
Figure 4:
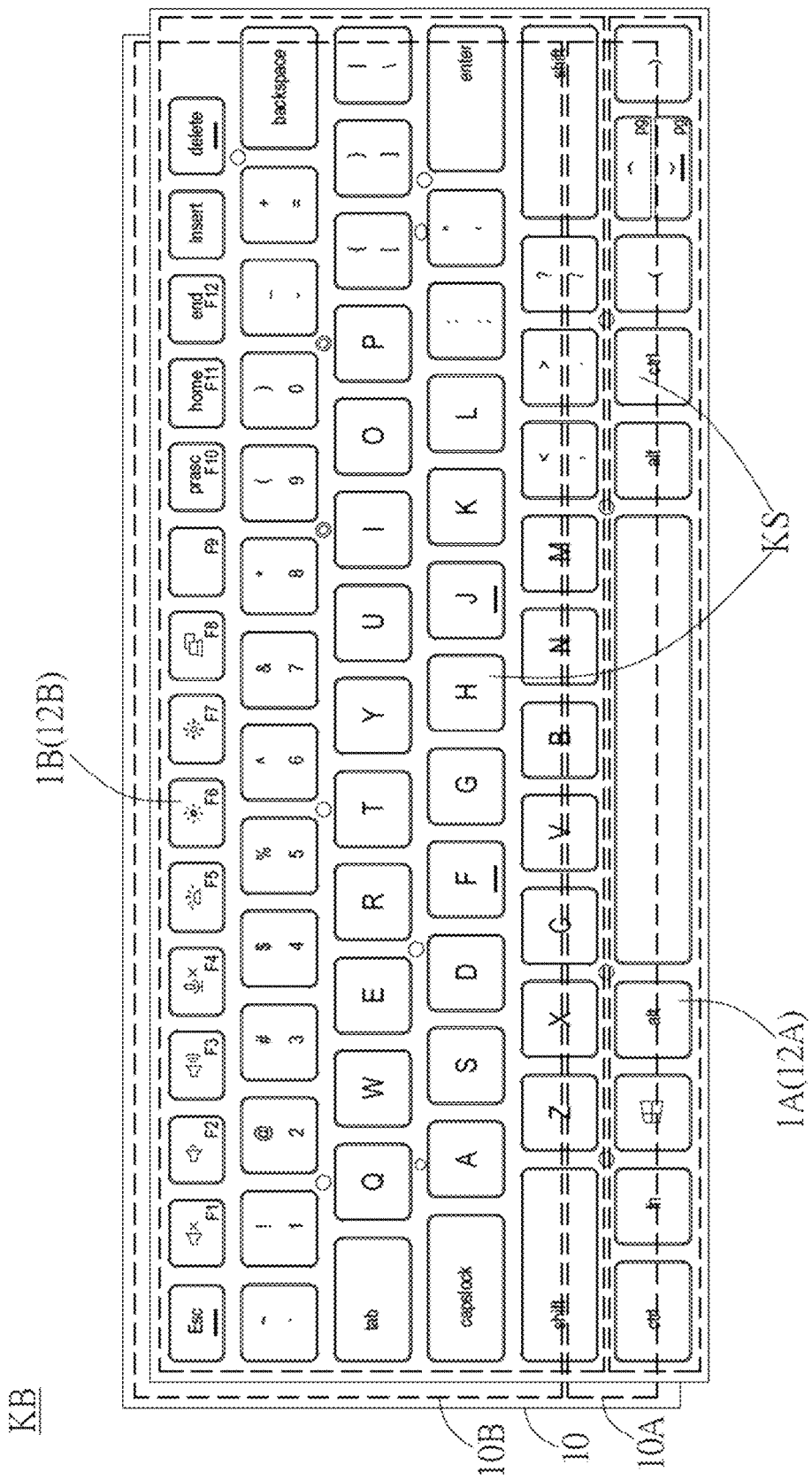
FIG. 4 is a schematic view of the backlit keyboard in a second embodiment of the invention.

Referring to FIG. 2 and FIG. 3, FIG. 3 is a schematic bottom view showing the lower surface of the lighting board around the illuminant in an embodiment of the invention. As shown in FIG. 2 and FIG. 3, the lighting circuit 120 is disposed on the insulation surface 110a and located at a side opposite to the plurality of coupling members 115. Specifically, the coupling members 115 and the lighting circuit 120 are located on the upper surface and the lower surface (i.e., the insulation surface 110a) of the substrate 110, respectively. The lighting circuit 120 can be formed on the insulation surface 110a by printing metal paste (e.g. silver paste) or etching a metal foil (e.g. copper foil) to form a metal foil circuit. The lighting circuit 120 can include one or more main wirings 121 and one or more sub-wirings 123, which are configured to electrically connect the illuminant 130 with a driving component (not shown), so that the illuminant 130 can be driven to emit light.

The illuminant 130 is electrically connected to the lighting circuit 120 and configured to receive the power through the lighting circuit 120 for driving the illuminant 130 to emit light. For example, the illuminant 130 can be mounted on the lighting circuit 120 through a conductive adhesive to electrically connect the lighting circuit 120, but not limited thereto. In another embodiment, the illuminant 130 can be fixed on the insulation surface 110a through a non-conductive adhesive and then electrically connected to the lighting circuit 120 through other conductive wirings. The illuminant 130 can be embodied as a light-emitting diode (LED) of a single chip or multiple chips. In an embodiment, the illuminant 130 can be a side-lighting LED, which has a larger power and consumes high power, but can transmit light farther. Therefore, the backlit keyboard KB can be partially provided with several illuminants 130 to provide backlight to multiple keyswitches KS or even all keyswitches KS of the backlit keyboard KS, but not limited thereto. In another embodiment, the illuminant 130 can be a micro-LED (u LED), which can have a light-emitting pattern from five surfaces, such as a top surface and four side surfaces, and any keyswitch KS which requires backlight can be provided with a dedicated illuminant 130.

The protective layer 140 is disposed on the insulation surface 110a and covers the lighting circuit 120, thereby providing the lighting circuit 120 with waterproof and insulating effects. In an embodiment, the protective layer 140 preferably has a reflective surface 146 and/or one or more microstructures 144. The protective layer 140 is preferably made of reflective insulation material, so that the lower surface (a surface that is far away from the insulation surface 110a) of the protective layer 140 can serve as the reflective surface 146. In an embodiment, the protective layer 140 can be formed, for example, by printing a white paint or white ink on the insulation surface 110a of the substrate 110. The protective layer 140 preferably covers all the insulation surface 110a and the lighting circuit 120 except where the illuminant 130 is located to have a larger reflective surface 146, facilitating the recycle of light to the light guide sheet 210. From another aspect, the protective layer 140 can be an insulative reflective film with a hole 142 (shown in FIG. 3) corresponding to the illuminant 130, so that the illuminant 130 can protrude from the hole 142 toward the light guide sheet 210. Moreover, the protective layer 140 may have one or more through holes 148 (shown in FIG. 2) at locations corresponding to the openings 113 to allow light to emit out of the openings 113 though the though holes 148, but not limited thereto. According to practical applications, when the protective layer 140 is formed by a light permeable film, the protective layer 140 may not have such through holes, and the reflective surface 146 of the protective layer 140 can be formed by disposing the reflective material or coating on the lower surface of the protective layer 140. In an embodiment, the reflective surface 146 is preferably disposed not corresponding to the openings 113 of the substrate 110. Specifically, in the stacking direction, the vertical projection of the openings 113 at least partially does not overlap the reflective surface 146, so that light can emit out of the openings 113 of the substrate 110 through the protective layer 140 (or the through holes 148). In an embodiment, the microstructures 144 of the protective layer 140 preferably correspond to at least one of the plurality of ribs 117 of the substrate 110, so that the microstructures 144 and the at least one rib 117 at least partially overlap with each other in the stacking direction. From another aspect, the microstructures 144 of the protective layer 140 preferably correspond to the light impermeable region 124 of the keycap 12, so that the microstructures 144 and the light impermeable region 124 of the keycap 12 at least partially overlap with each other in the stacking direction. The microstructures 144 preferably direct light toward the light guide sheet 210 by reflection, scattering, or diffusion to enhance the recycle of light and the propagation in the transverse direction.

The light guide sheet 210 is disposed below the protective layer 140, and light emitted from the illuminant 130 can enter the light guide sheet 210 to propagate in the transverse direction to illuminate the at least one keycap 12. Specifically, the light guide sheet 210 has a light hole 212, and the illuminant 130 is accommodated in the light hole 212. The light guide sheet 210 can be a film-like or sheet-like plate, which can be made of any suitable optical materials, such as optical polymers. The light hole 212 is a through hole penetrating through the light guide sheet 210 in the thickness direction, so that the illuminant 130 can extend from the hole 142 of the protective layer 140 into the light hole 212. The light guide sheet 210 can further have a plurality of light-exit portions 214 configured to destroy the total reflection of light to emit light upward. The plurality of light-exit portions 214 are preferably disposed corresponding to the openings 113, but not limited thereto. The light-exit portions 214 can be disposed at any positions for light output as appropriate. The light-exit portion 214 can be any suitable optical microstructure, so when the light encounters the light-exit portion 214, the light will scatter upward out of the light guide sheet 210.

The backlit module BL can further include a glue layer 230. The glue layer 230 is disposed around the illuminant 130 and located between the light guide sheet 210 and the protective layer 140, and a glue-free region 232 is formed between the light hole 212 and the glue layer 230. The glue layer 230 is disposed on the top surface of the light guide sheet 210 and located around the light hole 212. Specifically, the glue layer 230 is configured to connect the protective layer 140 and the light guide sheet 210 and located around the light hole 212 (or the illuminant 130), so that the light guide sheet 210 and the illuminant 130 can be positioned by the glue layer 230 to enhance the optical coupling stability. Moreover, the glue layer 230 can be formed by optical materials, which are light permeable and have a refractive index closer to that of the light guide sheet 210 than the air. As such, the reflected light can enter the light guide sheet 210 at a relatively higher proportion and then propagates in the light guide sheet 210 by total reflection. The glue layer 230 is spaced apart from the edge of the light hole 212 of the light guide sheet 210 to form the glue-free region 232 therebetween, i.e., the region around the light hole 212 without the glue layer 230. Moreover, the vertical projection of the plurality of light-exit regions 214 on the lighting board 10 preferably does not overlap the ribs 117. In this embodiment, the plurality of light-exit regions 214 are preferably disposed outside the glue-free region 232 defined by the glue layer 230 to increase the proportion of light traveling along the transverse (horizontal) direction.

The reflective layer 220 is disposed at one side of the light guide sheet 210 opposite to the protective layer 140 (e.g. the lower side) and configured to reflect light that leaks from the bottom surface of the light guide sheet 210 back to the light guide sheet 210. Specifically, the reflective layer 220 can be a reflective film made of reflective materials (e.g. metal foil), a layer of reflective material coated on a non-reflective film, or a plastic film doped with reflective particles (e.g. PET film doped with reflective particles), but not limited thereto. In an embodiment, the reflective layer 220 can be a reflective sheet disposed on the lower surface of the light guide sheet 210, but not limited thereto. The reflective layer 220 can be provided with a microstructure 222, which is configured to direct light upward. For example, the microstructure 222 of the reflective layer 220 can be disposed corresponding to the light hole 212 of the light guide sheet 210 to effectively reflect light emitted from the illuminant 130 into the light guide sheet 210 from the sidewall of the light hole 212, but not limited thereto. The microstructure 222 can be disposed at any suitable location of the reflective layer 220 to increase the amount of light output and the recycle of light.

The backlit module BL can further include a glue layer 231. The glue layer 231 is disposed around the illuminant 130 and located between the light guide sheet 210 and the reflective layer 220, and a glue-free region 233 is formed between the light hole 212 and the glue layer 231. The glue layer 231 is disposed on the bottom surface of the light guide sheet 210 and located around the light hole 212. Specifically, the glue layer 231 is configured to connect the light guide sheet 210 and the reflective layer 220 and located around the light hole 212 (or the illuminant 130), so that the light guide sheet 210, the reflective layer 220, and the illuminant 130 can be positioned by the glue layer 231 to enhance the optical coupling stability. Moreover, the glue layer 231 can be formed by optical materials, which are light permeable and have a refractive index closer to that of the light guide sheet 210 than the air. As such, the reflected light can enter the light guide sheet 210 at a relatively higher proportion and then propagates in the light guide sheet 210 by total reflection. The glue layer 231 is spaced apart from the edge of the light hole 212 of the light guide sheet 210 to form the glue-free region 233 therebetween, i.e., the region around the light hole 212 without the glue layer 231. Moreover, in this embodiment, the plurality of light-exit regions 214 are preferably disposed outside the glue-free region 233 defined by the glue layer 231 to increase the proportion of light traveling along the transverse direction. In this embodiment, the glue-free regions 232 and 233 are the top surface region and the bottom surface region of the light guide sheet 210 around the light hole 212 without the glue layers 230 and 231, respectively. From another aspect, the glue-free regions 232 and 233 are the bottom surface region of the protective layer 140 and the top surface region of the reflective layer 220 around the light hole 212 of the light guide sheet 210 without the glue layers 230 and 231, respectively. As such, the glue layer 230 or 231 can be prevented from entering the light hole 212 to interfere with light output.

The switch circuit layer 16 can have an one-layered structure or a multi-layered structure, and the switch circuit 164 is formed on one or more layers thereof. In an embodiment, the switch circuit layer 16 can be implemented as a membrane circuit board having a multi-layered structure. The switch unit 162 and the switch circuit 164 can be disposed on one or more layers of the membrane circuit board. The switch unit 162 can be triggered by the triggering portion 182 as the keycap 12 moves downward. When the switch circuit layer 16 is implemented as the membrane circuit board, the triggering portion 182 can be a conductive type or non-conductive type triggering portion. In another embodiment, the switch circuit layer 16 can be formed by the printing technique or the etching process to form the switch unit 162 and the switch circuit 164 on the upper surface of the substrate 110, so that the lighting board 10 can further integrate the switch circuit to serve as the baseplate and the switch circuit board of the keyswitch and the light source circuit board of the backlit module at the same time, thereby further effectively reducing the overall thickness of the backlit keyswitch. It is noted that when the switch circuit layer 16 is formed by the printing technique or the etching process to form the switch unit 162 and the switch circuit 164 on the upper surface of the substrate 110, the upper surface of the substrate 110 is an insulation surface, and the triggering portion 182 is preferably a conductive type triggering portion. As such, the conductive type triggering portion 182 can conduct the switch unit 162 in the form of conductive pads by contacting the conductive pads.

As shown in FIG. 2 and FIG. 3, the hole 142 of the protective layer 140 is preferably smaller than the light hole 212 of the light guide sheet 210, but not limited thereto. Moreover, in the area corresponding to the glue-free region 230 or 231, the microstructure 144 of the protective layer 140 preferably corresponds to the microstructure 222 of the reflective layer 220, so that the microstructure 144 and the microstructure 222 at least partially overlap with each other in the stacking direction. From another aspect, the microstructure 222 of the reflective layer 220 is preferably disposed within the vertical projection of the light hole 212 of the light guide sheet 210 to direct light emitted from the illuminant 130 into the light guide sheet 210 from the sidewall of the light hole 212. The switch circuit layer 16 and the lighting circuit 120 are disposed at two opposite sides of the substrate 110 (e.g. upper side and lower side), respectively, and the vertical projection of the switch unit 162 overlaps the illuminant 130. Specifically, the switch circuit 164 and the lighting circuit 120 are disposed on the upper side and the lower side (such as the upper surface and the lower surface) of at least one of the plurality of ribs 117, respectively. The vertical projections of the switch unit 162 and the illuminant 130 fall within the range surrounded by the plurality of the coupling members 115.

Figure 5:
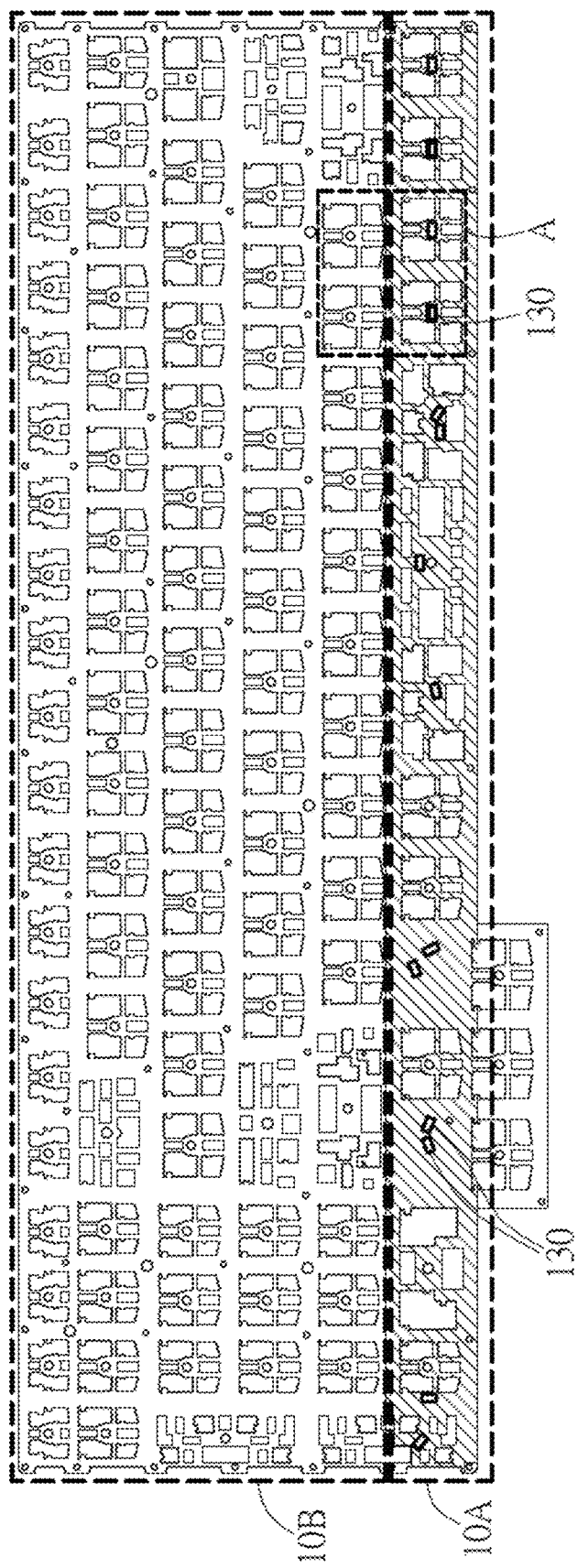
FIG. 5 is a schematic view of the lower surface of the lighting board in a second embodiment of the invention.
Figure 6:
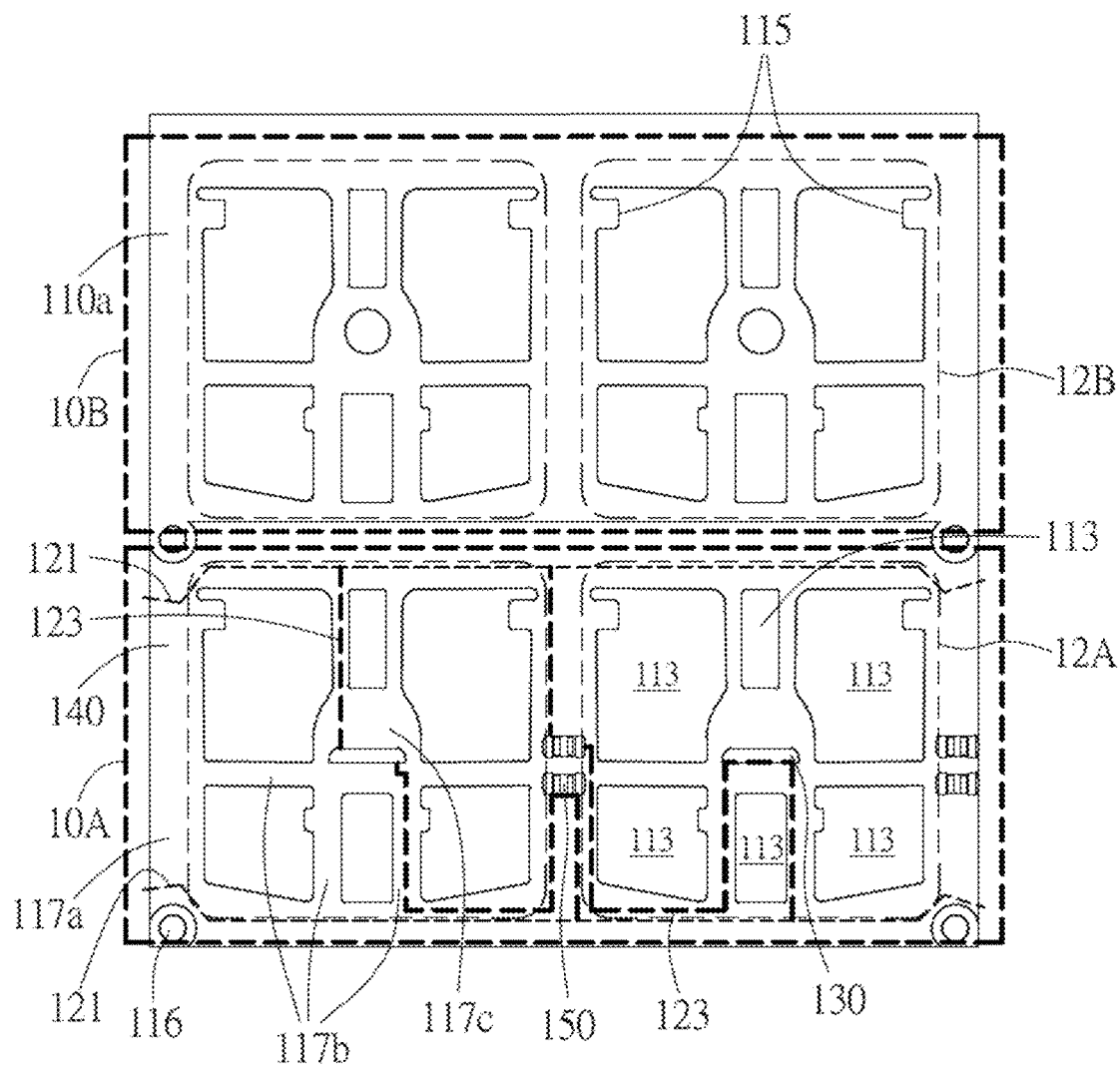
FIG. 6 is an enlarged view of the region A of FIG. 5.
Figure 7:
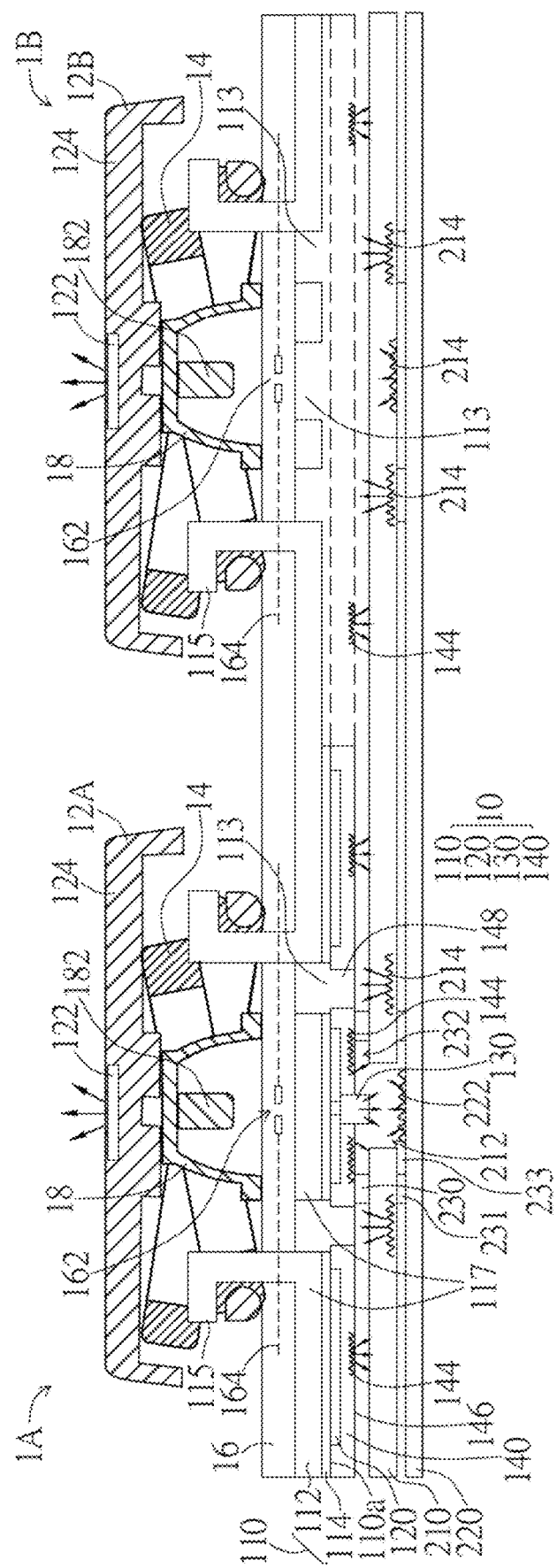
FIG. 7 is a schematic cross-sectional view of the backlit keyswitch in a second embodiment of the invention.

Referring to FIG. 4 to FIG. 7, FIG. 4 is a schematic view of the backlit keyboard in a second embodiment of the invention, FIG. 5 is a schematic view of the lower surface of the lighting board in a second embodiment of the invention, FIG. 6 is an enlarged view of the region A of FIG. 5, and FIG. 7 is a schematic cross-sectional view of the backlit keyswitch in a second embodiment of the invention. As shown in FIG. 4 to FIG. 7, the lighting board 10 of the backlit keyboard KB can be divided into a circuit area 10A and a non-circuit area 10B. The backlit keyboard KB includes a plurality of keyswitches KS, and the plurality of keyswitches KS can be divided into a plurality of first keyswitches 1A and a plurality of second keyswitches 1B. The plurality of first keyswitches 1A vertically correspond to the circuit area 10A of the lighting board 10, and the plurality of second keyswitches 1B vertically correspond to the non-circuit area 10B of the lighting board 10. From another aspect, the lighting board 10 is configured to support the first keyswitches 1A and the second keyswitches 1B. Specifically, the plurality of keyswitches KS are arranged in multiple rows along the short axis direction of the backlit keyboard KB, and the keyswitches KS in each row are arranged along the long axis direction of the backlit keyboard KS. In this embodiment, the lighting board 10 is divided along the short axis direction into the circuit area 10A and the non-circuit area 10B, which are adjacent to each other. The plurality of first keyswitches 1A are keyswitches of the last row (or the bottommost row), and the plurality of second keyswitches 1B are keyswitches of the rest of rows. With such a configuration, a plurality of illuminants 130 and the circuit area 10A can be gathered at one of the long sides (e.g. the lower side in the figure) of the lighting board 10, and by means of the side-lighting LEDs with large power, light can be transmitted to the non-circuit area 10B through the light guide sheet 210.

In this embodiment, the lighting circuit 120 of the lighting board 10 is preferably disposed only in the circuit area 10A, and the non-circuit area 10B of the lighting board 10 is not disposed with the lighting circuit 120. The illuminants 130 are electrically connected to the lighting circuit 120 and correspond to one or more first keycaps 12A of the first keyswitches 1A. In other words, at least one of the illuminants 130 is preferably located within the vertical projection of the first keycap 12A, but not limited thereto. According to practical applications, the illuminant 130 can be located at other suitable locations in the circuit area 10A and is not necessarily to be located right under the first keycap 12A. The protective layer 140 is disposed on the insulation surface 110a and covers the lighting circuit 120, and the protective layer 140 corresponds to at least the first keycap 12A.

As shown in FIG. 6 and FIG. 7, the first keycap 12A is adjacent to the second keycap 12B. The first keycap 12A is located in the circuit area 10A, and the second keycap 12B is located in the non-circuit area 10B. In the range of vertical projection of the first keycap 12A, the vertical projection of the switch circuit 164 of the switch circuit layer 16 disposed above the lighting board 10 at least partially overlaps the lighting circuit 120 disposed below the lighting board 10. In the range of vertical projection of the second keycap 12B, either the lighting circuit 120 or the illuminant 130 is not disposed on the lower surface of the lighting board 10. Light emitted from the illuminant 130 located within the vertical projection of the first keycap 12A can be transmitted in the transverse direction through the light guide sheet 210 to illuminate the light permeable region 122 of the second keycap 12B. In the range of vertical projection of the second keycap 12B, the insulation layer 114 and/or the protective layer 140 can be optionally disposed on the lower surface of the lighting board 10. In other words, the insulation surface 110a and/or the protective layer 140 can optionally extend to further correspond to (overlap) the second keycap 12B. The lighting circuit 120 may include main wirings 121 and sub-wirings 123, and the lighting circuit 120 is distributed on the insulation surface 110a (e.g. lower surface) of the substrate 110 and at least partially overlaps the ribs 117. For example, the lighting circuit 120 can be distributed on the lower surface of the frame rib 117a, the bridge rib 117b, the central island rib 117c. In order to avoid the switch circuit 164 of the switch circuit layer 16 appearing on the openings 113 of the substrate 110 to block the light, the switch circuit 164 is preferably disposed within the upper vertical projection of the ribs 117 of the substrate 110. For example, the switch circuit 164 can be distributed on the upper surface of the frame rib 117a, the bridge rib 117b, the central island rib 117c. With such a configuration, the switch circuit 164 may have a switch circuit section, which overlaps the lighting circuit section of the lighting circuit 120. The switch circuit section and the lighting circuit section can be respectively arranged on the upper and lower vertical projections of the same frame rib 117a, bridge rib 117b, or central island rib 117c and partially parallel to each other. In addition, the lighting circuit 120 may further include one or more electronic elements 150 on the path of the main wiring 121 and/or the sub-wiring 123. For example, the electronic element 150 can be a resistor and disposed on the path of the sub-wiring 123, but not limited thereto.

Figure 8:
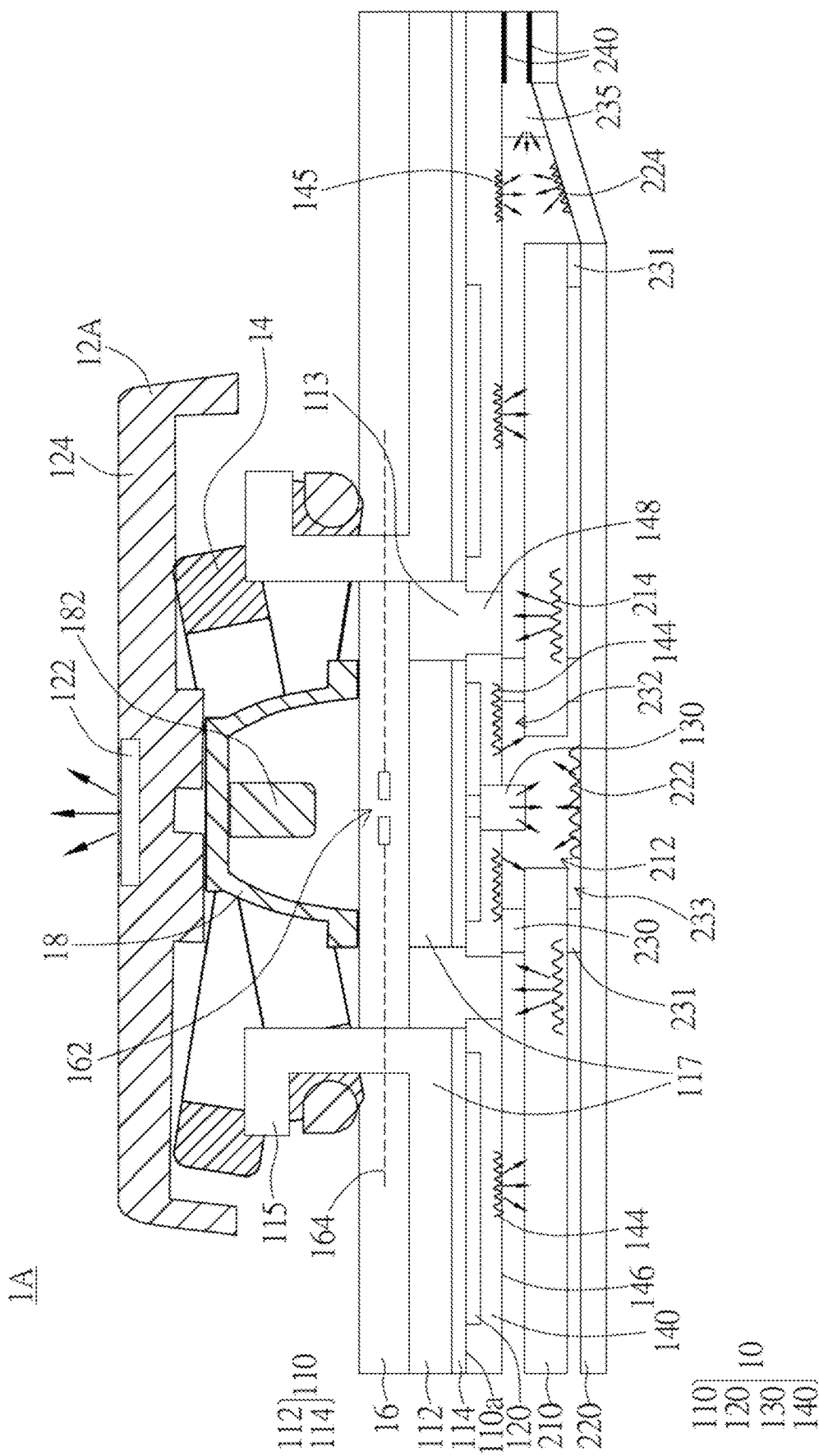
FIG. 8 is a schematic cross-sectional view of the backlit keyswitch in a third embodiment of the invention.

Moreover, the light leakage and recycle is particularly important at the edges of the long/short sides of the backlit keyboard and the edges of the through holes. FIG. 8 is a schematic cross-sectional view of the backlit keyswitch (e.g. the first keyswitch 1A) in a third embodiment of the invention, which is illustrated to explain the light leakage and recycle at the edge in the circuit area 10A. Herein, "the edge" can refer to the edge of the long or short side of the backlit keyboard or the edge of the through hole 116 shown in FIG. 6 or other through holes. The through hole 116 can be a heat dissipation hole or a positioning hole of the backlit keyswitch (or keyboard). As shown in FIG. 8, the entire surface of the protective layer 140 in the circuit area 10A can have the reflective effect to recycle light into the light guide sheet 210. The reflective layer 220 is attached to the protective layer 140 by a side glue layer 235, and the reflective layer 220 has a microstructure 224 disposed between the side glue layer 235 and the light guide sheet 210. For example, at the edge of the long/short side or the through hole 116 of the backlit keyboard, the side glue layer 235 can be disposed between the lower surface of the protective layer 140 and the upper surface of the reflective layer 220. The reflective layer 220 can be bent upward to be adhered to the protective layer 140 and enclose the light guide sheet 210 therein. In other words, at the edge in the circuit area 10A, such as the edge of the long/short side of the lighting board and the through hole 116 or other through holes, the edge of the reflective layer 220 (e.g. the edge of the long/short side or the through hole) can be bent upward to block light leaking from the side surface of the light guide sheet 210 and to be adhered to the lower surface of the lighting board 10 (e.g. the lower surface of the protective layer 140) by the side glue layer 235. The side glue layer 235 is disposed at the edge and between the protective layer 140 and the reflective layer 220. The side glue layer 235 preferably has good optical transmission and local reflection effects, so that no matter whether the side glue layer 235 is located at the reflective surface of the protective layer 140 or the reflective layer 220, the side glue layer 235 can provide a certain reflection effect to recycle light into the light guide sheet 210. The reflective layer 220 may have the microstructure 224 at the bending surface. The microstructure 224 is located between the side surface of the light guide sheet 210 and the side glue layer 235 and configured to recycle light which might leaks from the edge of the long/short side or the through hole 116. Similarly, the protective layer 140 may have a microstructure 145, which is disposed adjacent to the side glue layer 235 and corresponds to the microstructure 224, to facilitate the recycle of light. In addition, the glue layer 231 can be further disposed close to the side edge of the light guide sheet 210 to adhere the edge portion of the light guide sheet 210 and the reflective layer 220.

The backlit module BL can further include a light-absorption layer 240. The light-absorption layer 240 is disposed between the protective layer 140 and the reflective layer 220 or between the substrate 110 and the reflective layer 220. The light-absorption layer 240 is adjacent to the edge of the reflective layer 220. For example, at the edge in the circuit area 10A, no matter whether the edge of the reflective layer 220 is bent or not bent, the light-absorption layer 240 can be disposed on the lower surface of the protective layer 140 and/or the upper surface of the reflective layer 220 to reduce the chance of light leaking from the edge of the long/short side of the backlit keyboard and the through hole 116 or other holes. Moreover, when the light-absorption layer 240 is disposed, the side glue layer 235 can be located on the surface of the light-absorption layer 240, and the side glue layer 235 also can provide a certain reflection effect to recycle light into the light guide sheet 210. In an embodiment, the light-absorption layer 240 can be made of any suitable light-absorbing material or light-blocking material.

Figure 9:
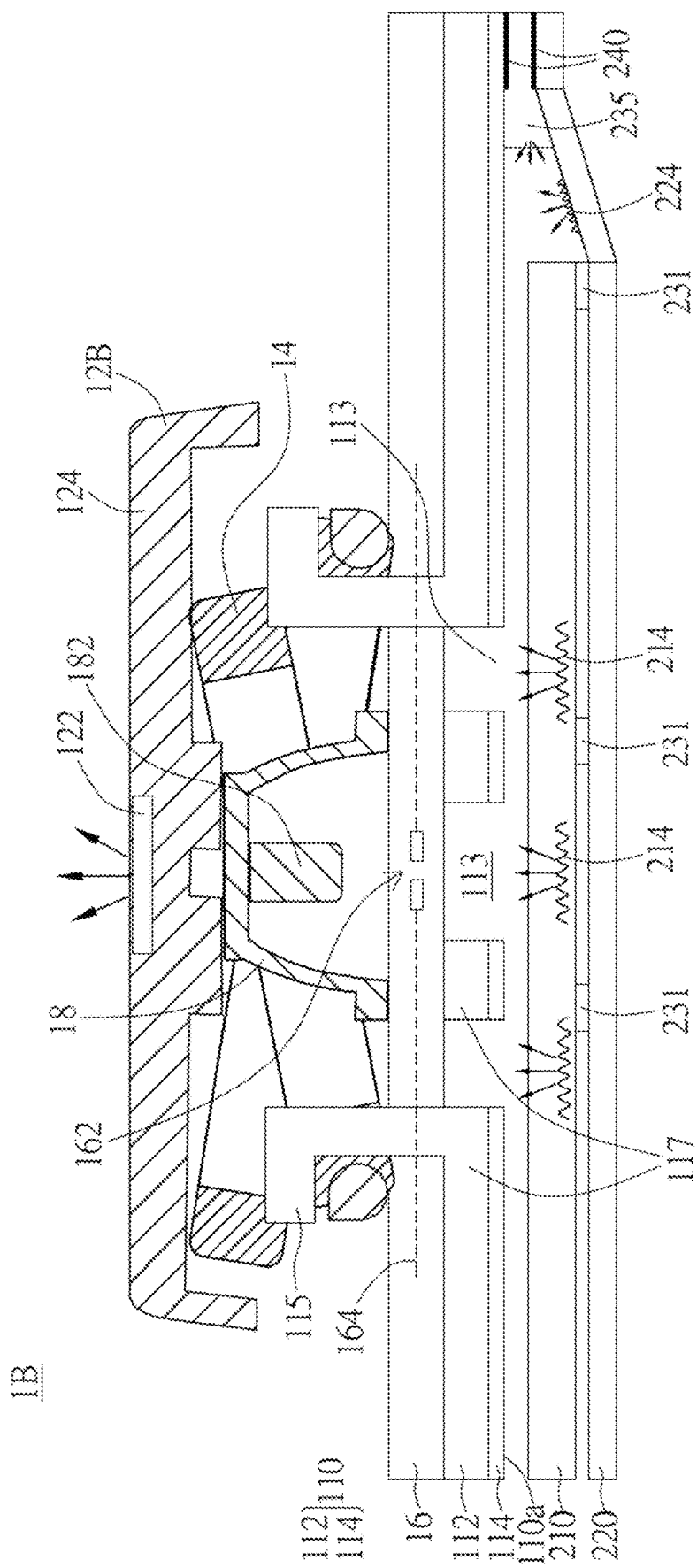
FIG. 9 is a schematic cross-sectional view of the keyswitch in the non-circuit area of the third embodiment of the invention.

FIG. 9 is a schematic cross-sectional view of the keyswitch (e.g. the second keyswitch 1B) in the non-circuit area of the third embodiment of the invention, which is illustrated to explain the light leakage and recycle at the edge in the non-circuit area 10B. As shown in FIG. 9, the protective layer 140 may not extend to the non-circuit area 10B, so that in the non-circuit area 10B the lower surface of the lighting board 10 may be exposed. In the embodiment that the substrate 110 is made of non-metal plate, the exposed lower surface of the lighting board 10 in the non-circuit area 10B can be the insulation surface 110a. In the embodiment that the substrate 110 is formed by the metal plate 112 and the insulation layer 114, the exposed lower surface of the lighting board 10 in the non-circuit area 10B can be the surface of the insulation layer 114 or the metal plate 112. In other words, in the embodiment that the substrate 110 is formed by the metal plate 112 and the insulation layer 114, the insulation layer 114 can be disposed on both of the circuit area 10A and the non-circuit area 10B or only disposed on the circuit area 10A. Similarly, at the edge in the non-circuit area 10B, such as the edge of the long/short side of the lighting board and the through hole 116 or other through holes, the edge of the reflective layer 220 (e.g. the edge of the long/short side or the through hole) can be bent upward to block light leaking from the side surface of the light guide sheet 210 and to be adhered to the lower surface of the lighting board 10 (e.g. the lower surface of the protective layer 140, the insulation layer 114, the substrate 110, or the metal plate 112) by the side glue layer 235. When the protective layer 140 extends to the non-circuit area 10B, the edge of the reflective layer 220 is adhered to the protective layer 140 in a manner similar to the configuration shown in the circuit area 10A of FIG. 8. For example, the reflective layer 220 and the protective layer 140 can optionally respectively have the microstructures 224 and 145 to enhance the recycle of light. When the protective layer 140 is not disposed in the non-circuit area 10B, the edge of the reflective layer 220 is attached to the lower surface of the substrate 110 (e.g. the lower surface of the insulation surface 110a, the insulation layer 114, or the metal plate 112). As shown in FIG. 9, the reflective layer 220 can optionally have the microstructure 224 to facilitate the recycle of light. Moreover, at the edge in the non-circuit area 10B, no matter whether the edge of the reflective layer 220 is bent or not bent, the light-absorption layer 240 can be disposed on the lower surface of the substrate 110, the insulation layer 114, the metal plate 112, or the protective layer 140, and/or the upper surface of the reflective layer 220 to reduce light leakage. In an embodiment, the side glue layer 235 can be disposed adjacent to the edge and between the substrate 110 (e.g. the insulation layer 114 or the metal plate 112) and the reflective layer 220. In another embodiment, the side glue layer 235 can be disposed at the edge and between the protective layer 140 and the reflective layer 220. The side glue layer 235 preferably has good optical transmission and local reflection effects, so that no matter whether the side glue layer 235 is located at the reflective surface of the protective layer 140 or the reflective layer 220, or the surface of the light-absorption layer 240, the side glue layer 235 can provide a certain reflection effect to recycle light into the light guide sheet 210.

Figure 10:
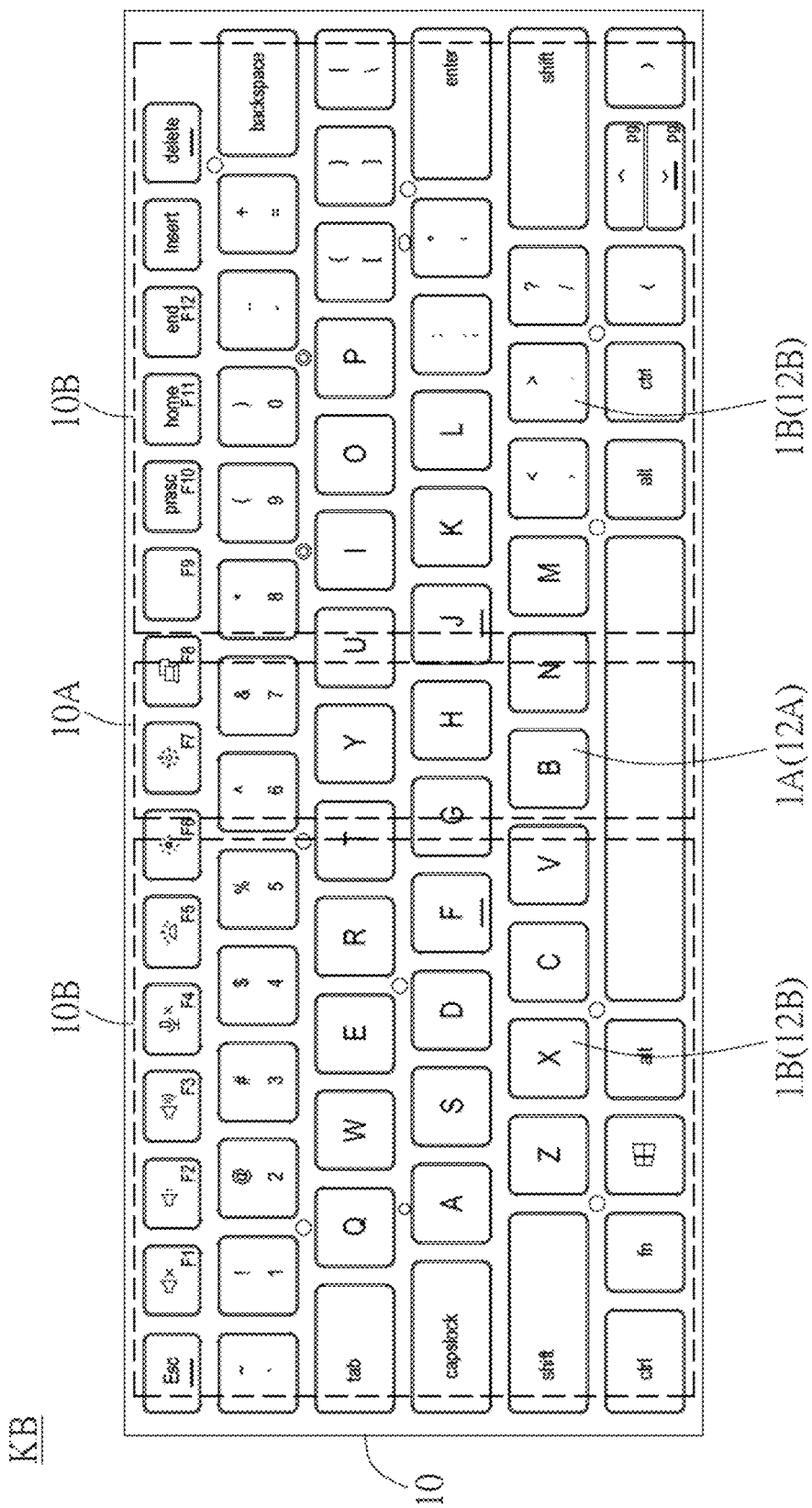
FIG. 10 is a schematic view of the backlit keyboard in a third embodiment of the invention.

FIG. 10 is a schematic view of the backlit keyboard in a third embodiment of the invention. As shown in FIG. 10, in this embodiment, the lighting board 10 of the backlit keyboard KB is divided into one circuit area 10A and two non-circuit areas 10B along the long axis direction, and the circuit area 10A is located between the two non-circuit areas 10B. Specifically, the circuit area 10A is preferably located at the central region of the backlit keyboard KB, so that the first keycaps 12A of the plurality of first keyswitches 1A vertically correspond to the circuit area 10A. The two non-circuit areas 10B are respectively located at left and right sides of the circuit area 10A, and each non-circuit area 10B includes a plurality of second keyswitches 1B arranged in multiple rows. The second keycaps 12B of the multiple rows of second keyswitches 1B are arranged in parallel and vertically correspond to the non-circuit area 10B. In this embodiment, the details of structure of the first keyswitch 1A and the second keyswitch 1B can refer to the related descriptions of the previous embodiments and will not elaborate hereinafter.

Figure 11:
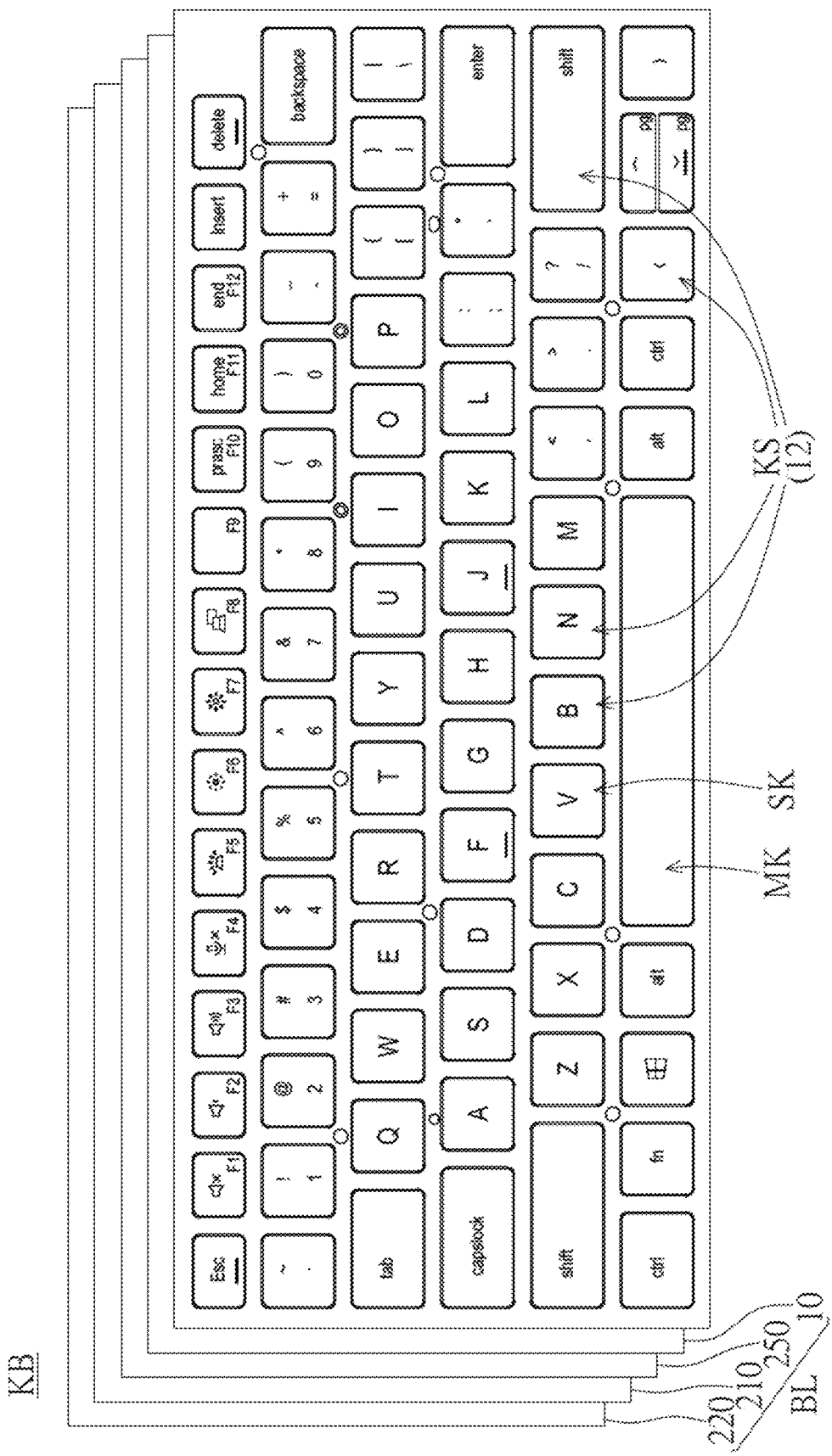
FIG. 11 is a schematic view of the backlit keyboard in a fourth embodiment of the invention.
Figure 12:
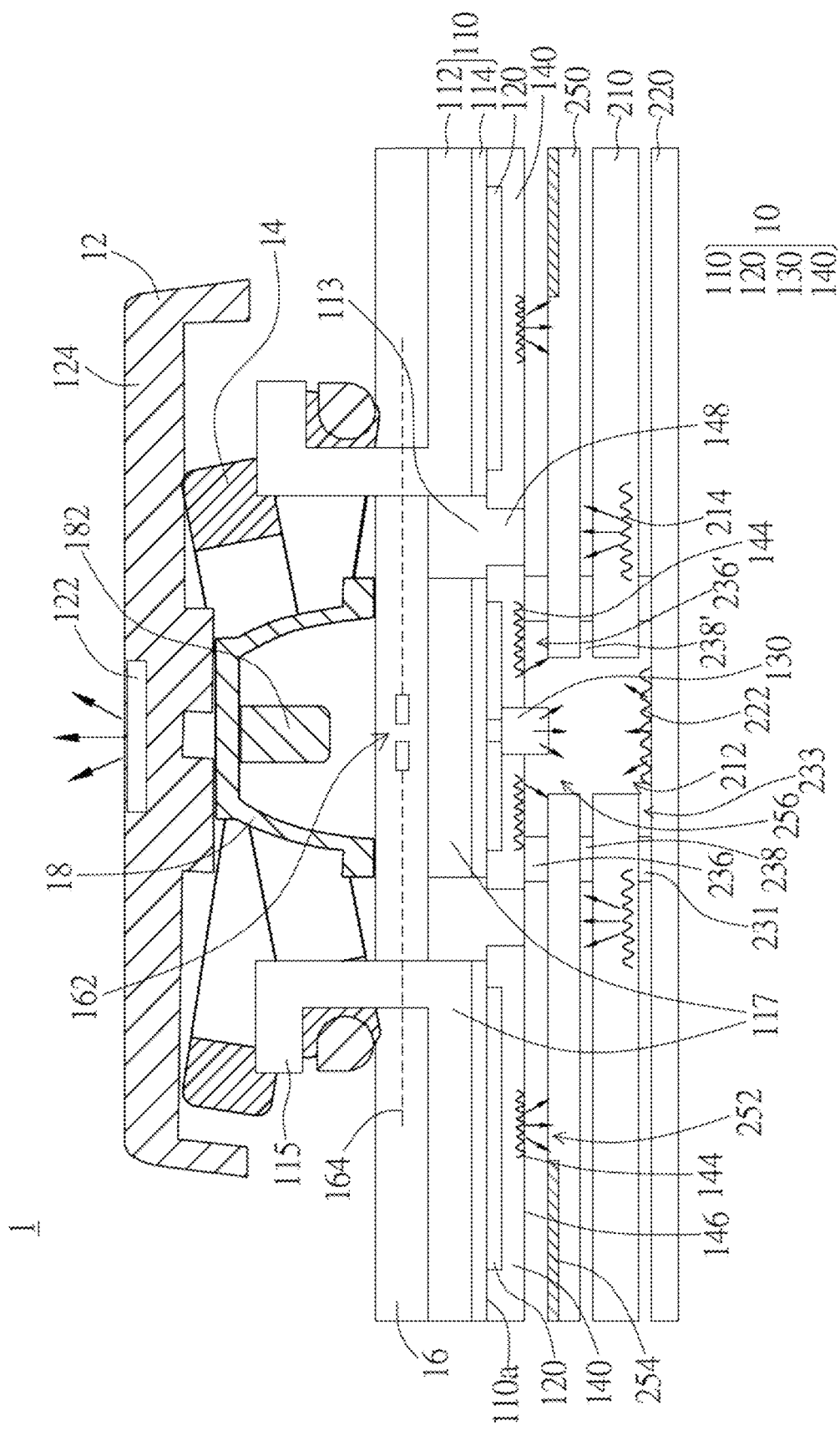
FIG. 12 is a schematic cross-sectional view of the backlit keyswitch in a fourth embodiment of the invention.

Referring to FIG. 11 and FIG. 12, FIG. 11 is a schematic view of the backlit keyboard in a fourth embodiment of the invention, and FIG. 12 is a schematic cross-sectional view of the backlit keyswitch in a fourth embodiment of the invention. As shown in FIG. 11 and FIG. 12, in this embodiment, the backlit module BL further include a mask film 250. The mask film 250 is disposed between the protective layer 140 and the light guide sheet 210. The mask film 250 has at least one light-permeable window 252 corresponding to at least one keycap 12 (or the first keycap 12A). Specifically, the mask film 250 can be a light permeable film (such as polyethylene terephthalate (PET) film) with a light-blocking coating 254 formed by light-blocking materials (coating materials) thereon to define a plurality of light-permeable windows 252. The light-blocking coating 254 can have a one layer structure or a multiple-layer structure and is configured to reflect or absorb light, so that most of light can emit to the openings 113 of the lighting board 10 from the light-permeable windows 252. For example, the light-blocking material can include white paint (white ink) and/or black paint (black ink), but not limited thereto. According to practical applications, the light-blocking coating 254 can be disposed on the upper surface and/or the lower surface of the mask film 250. The light-blocking material can be any suitable optical materials, and the light-blocking coating 254 can be formed by any suitable manner (e.g. printing), so that the mask film 250 has a light-blocking portion (e.g. 254) and a light-permeable portion (e.g. 252) to achieve the effect of partially blocking light and partially allowing light to pass therethrough. In this embodiment, the mask film 250 can have an illuminant hole 256. The illuminant hole 256 is disposed corresponding to the illuminant 130, so that the illuminant 130 can extend through the illuminant hole 256 into the light hole 212 of the light guide sheet 210. In an embodiment, the light-permeable windows 252 of the mask film 250 are preferably disposed corresponding to the keycaps 12 in an one-to-one manner, and the light-permeable window 252 preferably retreats inside the profile of the corresponding keycap 12 to enhance the uniformity of edge halo of the keycaps 12, but not limited thereto. Moreover, the mask film 250 and the protective layer 140 can be adhered by a glue layer 236. For example, the glue layer 236 is disposed around the illuminant 130 and located between the mask film 250 and the protective layer 140, and a glue-free region 236' is formed between the illuminant hole 256 and the glue layer 236. The mask film 250 and the light guide sheet 210 can be adhered by a glue layer 238. For example, the glue layer 238 is disposed around the illuminant 130 and located between the mask film 250 and the light guide sheet 210, and a glue-free region 238' is formed between the illuminant hole 256 and the glue layer 238.

In another embodiment, the mask film 250 can be integrated with the protective layer 140, so that the mask film 250 not only has the effect of partially blocking light and partially allowing light to pass therethrough, but also functions as the protective layer for protecting the lighting circuit 120, and the protective layer 140 can be omitted to further reduce the overall thickness of keyswitch. From another aspect, the protective layer 140 can be integrated with the mask film 250, so that the protective layer 140 not only protects the lighting circuit 120, but also has the effect of partially blocking light and partially allowing light to pass therethrough to function as the mask film, and the mask film 250 can be omitted to further reduce the overall thickness of keyswitch.

Figure 13:
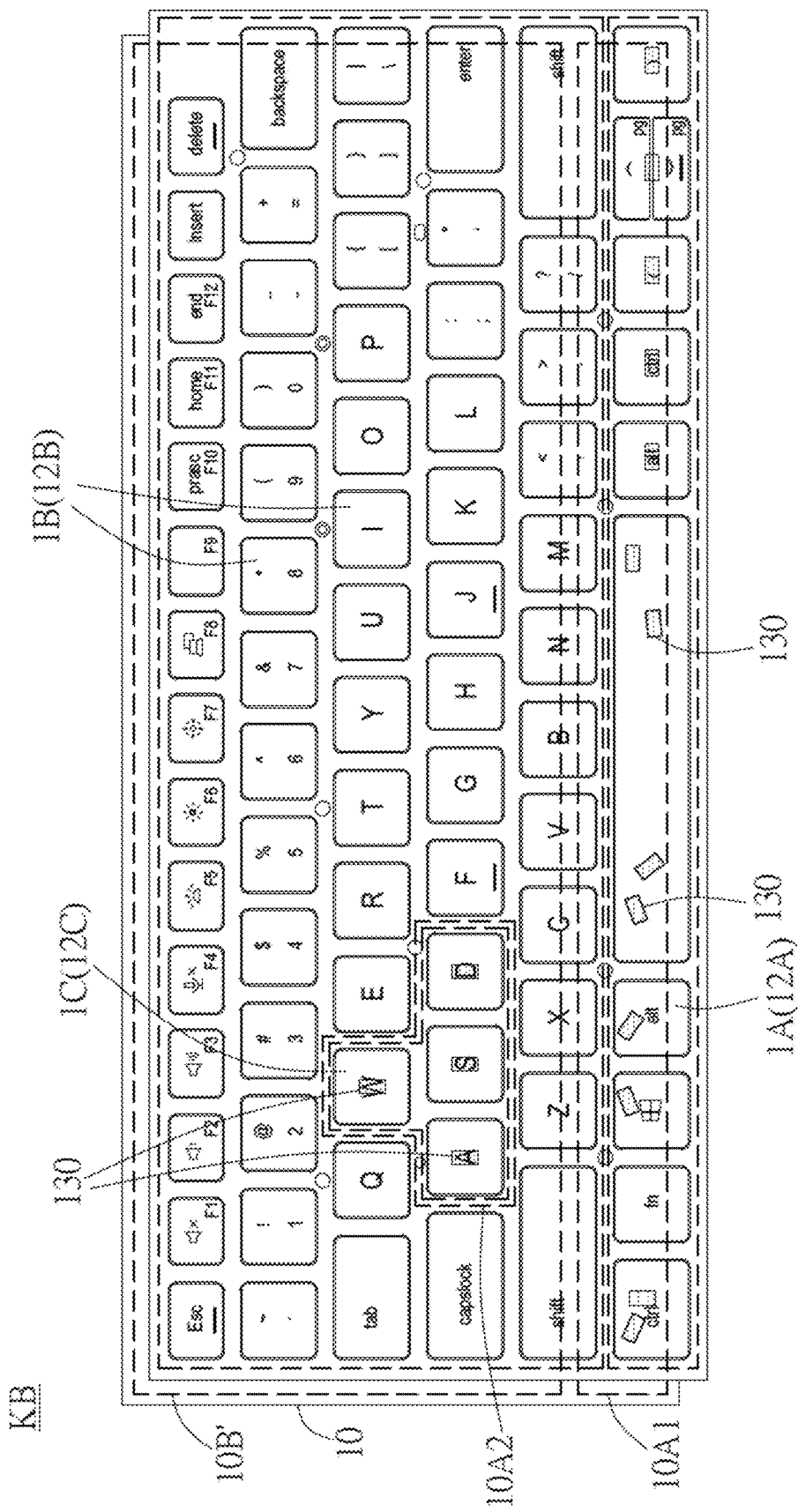
FIG. 13 is a schematic view of the backlit keyboard in a fifth embodiment of the invention.

FIG. 13 is a schematic view of the backlit keyboard in a fifth embodiment of the invention. As shown in FIG. 13, in this embodiment, the lighting board 10 of the backlit keyboard KB has a first circuit area 10A1, a second circuit area 10A2, and a non-circuit area 10B'. Specifically, the first circuit area 10A1 and the non-circuit area 10B' are disposed along the short axis direction, and the second circuit area 10A2 is disposed in the non-circuit area 10B' and surrounded by the non-circuit area 10B'. For example, the first circuit area 10A1 and the non-circuit area 10B' can be configured in a manner similar to the circuit area 10A and the non-circuit area 10B of FIG. 4, and a portion of the non-circuit area 10B of FIG. 4 that one or more keyswitches (e.g. W, A, S, D key) correspond thereto can be modified to be the second circuit area 10A2. In the first circuit area 10A1, a plurality of first keyswitches 1A share one or more illuminants 130. In the second circuit area 10A2, one or more third keyswitches 1C each has a dedicated illuminant 130, and the third keycaps 12C of the one or more third keyswitches 1C vertically correspond to the second circuit area 10A2. In an embodiment, each of the first circuit area 10A1 and the second circuit area 10A2 can have an independent driving chip or an independent connector to be operated independently, but not limited thereto. In another embodiment, the first circuit area 10A1 and the second circuit area 10A2 can be electrically connected to share a common driving chip or connector.

Figure 14:
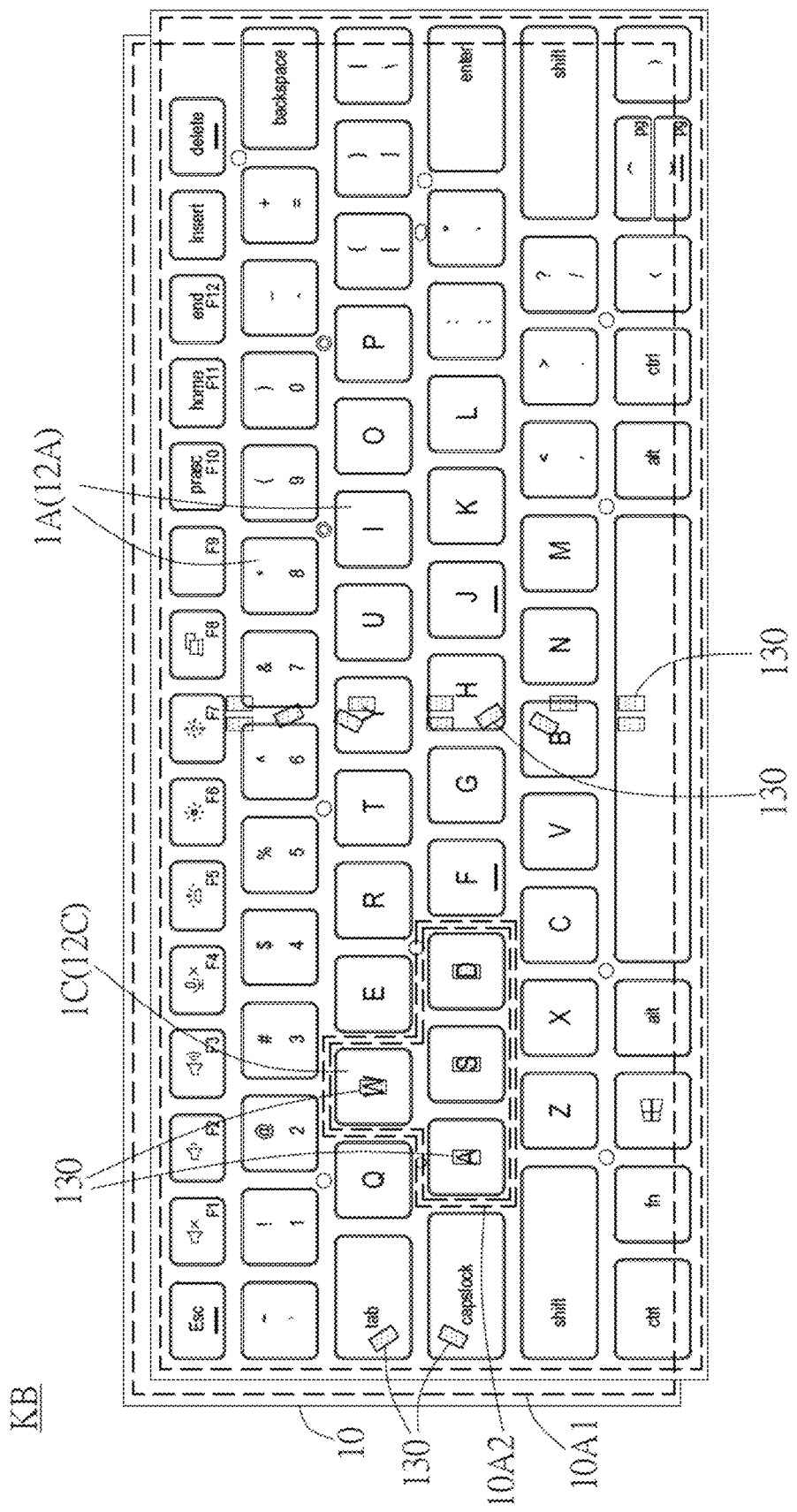
FIG. 14 is a schematic view of the backlit keyboard in a sixth embodiment of the invention.

FIG. 14 is a schematic view of the backlit keyboard in a sixth embodiment of the invention. As shown in FIG. 14, the lighting board 10 of the backlit keyboard KB has a plurality of circuit areas (e.g. the first circuit area 10A1 and the second circuit area 10A2). Specifically, the second circuit area 10A2 can include one or more keyswitches (e.g. W, A, S, D key), and the rest of keyswitches are disposed in the first circuit area 10A1. In the first circuit area 10A1, the plurality of first keyswitches 1A are arranged in multiple rows. The keycaps 12A of the multiple rows of first keyswitches 1A are arranged in parallel and vertically correspond to the first circuit area 10A1. In the first circuit area 10A1, a plurality of first keyswitches 1A share one or more illuminants 130, and the illuminants 130 can be arranged along the short axis direction and located at the central region and/or the edge of the backlit keyboard KB. In the second circuit area 10A2, one or more third keyswitches 1C each has a dedicated illuminant 130, and the third keycaps 12C of the one or more third keyswitches 1C vertically correspond to the second circuit area 10A2. In an embodiment, each of the first circuit area 10A1 and the second circuit area 10A2 can have an independent driving chip or an independent connector to be operated independently, but not limited thereto. In another embodiment, the first circuit area 10A1 and the second circuit area 10A2 can be electrically connected to share a common driving chip or connector. In this embodiment, the first circuit area 10A1 and the second circuit area 10A2 can be provided with side-lighting LEDs with large power or micro-LEDs.

Although the preferred embodiments of the invention have been described herein, the above description is merely illustrative. The preferred embodiments disclosed will not limit the scope of the invention. Further modification of the invention herein disclosed will occur to those skilled in the respective arts and all such modifications are deemed to be within the scope of the invention as defined by the appended claims.

What is claimed is:

1. A lighting board for supporting at least one keycap, comprising:
   a substrate having an insulation surface, a plurality of openings penetrating through the substrate, and a plurality of coupling members disposed on the substrate and configured to directly or indirectly connect the at least one keycap;
   a lighting circuit disposed on the insulation surface and located at a side of the substrate opposite to the plurality of coupling members;
   an illuminant electrically connected to the lighting circuit; and
   a protective layer disposed on the insulation surface and covering the lighting circuit.

2. The lighting board of claim 1, wherein the substrate is a non-metal plate, and the insulation surface is a lower surface of the non-metal plate.

3. The lighting board of claim 1, wherein the substrate comprises a metal plate and an insulation layer at least partially covering a lower surface of the metal plate; a surface of the insulation layer serves as the insulation surface.

4. The lighting board of claim 1, wherein the substrate has a plurality of ribs configured to define the plurality of openings; the protective layer has a reflective surface and/or a microstructure; the microstructure overlaps at least one of the plurality of ribs.

5. A backlit keyswitch, comprising:
   the lighting board of claim 1; and
   the at least one keycap.

6. The lighting board of claim 1, wherein the at least one keycap comprises a first keycap and a second keycap; the insulation surface, the illuminant, and the protective layer corresponds to at least the first keycap; the plurality of coupling members are configured to directly or indirectly connect the first keycap and the second keycap, so that the first keycap and the second keycap are capable of moving relative to the lighting board independently.

7. The lighting board of claim 6, wherein the insulation surface further corresponds to the second keycap.

8. The lighting board of claim 6, wherein the protective layer further corresponds to the second keycap.

9. The lighting board of claim 1, further comprising a switch circuit layer, wherein the switch circuit layer and the lighting circuit are disposed at two opposite sides of the substrate; the switch circuit layer has a switch unit; a vertical projection of the switch unit overlaps the illuminant.

10. The lighting board of claim 9, wherein the vertical projection of the switch unit and a vertical projection of the illuminant fall within a range surrounded by the plurality of coupling members.

11. The lighting board of claim 9, wherein the switch circuit layer has a switch circuit electrically connected to the switch unit; a vertical projection of the switch circuit overlaps the lighting circuit.

12. The lighting board of claim 11, wherein the substrate has a plurality of ribs configured to define the plurality of openings; the switch circuit and the lighting circuit are disposed above and below at least one of the plurality of ribs, respectively.

13. A backlit module, comprising:
   the lighting board of claim 1; and
   a light guide sheet,
   wherein light emitted from the illuminant enters the light guide sheet to propagate transversely to illuminate the at least one keycap.

14. The backlit module of claim 13, further comprising a mask film disposed between the protective layer and the light guide sheet, wherein the mask film has at least one light-permeable window corresponding to the at least one keycap.

15. The backlit module of claim 13, wherein the light guide sheet has a light hole; the illuminant is accommodated in the light hole.

16. The backlit module of claim 15, further comprising a glue layer disposed around the illuminant and located between the light guide sheet and the protective layer, wherein a glue-free region is formed between the light hole and the glue layer.

17. The backlit module of claim 15, further comprising a reflective layer disposed at a side of the light guide sheet opposite to the protective layer, wherein the reflective layer has a microstructure located within a vertical projection of the light hole of the light guide sheet.

18. The backlit module of claim 13, further comprising a reflective layer disposed at a side of the light guide sheet opposite to the protective layer, wherein the reflective layer has an edge attached to the protective layer or the substrate.

19. The backlit module of claim 18, wherein the reflective layer is attached to the protective layer or the substrate by a side glue layer; the reflective layer has a microstructure disposed between the side glue layer and the light guide sheet.

20. The backlit module of claim 18, further comprising a light-absorption layer disposed between the protective layer and the reflective layer or between the substrate and the reflective layer; the light-absorption layer is adjacent to the edge of the reflective layer.

* * * * *